United States Patent
Pennanen (10) Patent No.: US 10,304,040 B2
(45) Date of Patent: May 28, 2019

(54) SYSTEM AND METHOD FOR EXECUTING FINANCIAL TRANSACTIONS

(71) Applicant: MONI Limited, London (GB)

(72) Inventor: Antti Pennanen, Helsinki (FI)

(73) Assignee: MONI LIMITED, London (GB)

( * ) Notice: Subject to any disclaimer, the term of this patent is extended or adjusted under 35 U.S.C. 154(b) by 866 days.

(21) Appl. No.: 14/720,459

(22) Filed: May 22, 2015

(65) Prior Publication Data
US 2015/0356524 A1 Dec. 10, 2015

Related U.S. Application Data (63) Continuation-in-part of application No. 14/295,968, filed on Jun. 4, 2014, now Pat. No. 9,818,092.

(51) Int. Cl.
| | |
|---|---|
| *G06Q 20/06* | (2012.01) |
| *G06Q 20/40* | (2012.01) |
| *G06Q 20/36* | (2012.01) |
| *H04L 9/32* | (2006.01) |

(52) U.S. Cl.
CPC ........ *G06Q 20/065* (2013.01); *G06Q 20/367* (2013.01); *G06Q 20/4012* (2013.01); *H04L 9/3239* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,230,272 B1* | 5/2001 | Lockhart | ................ | G06F 21/62 |
| | | | | 726/2 |
| 6,895,391 B1* | 5/2005 | Kausik | .................... | G06F 21/34 |
| | | | | 705/50 |
| 7,478,065 B1* | 1/2009 | Ritter | ..................... | G06Q 20/20 |
| | | | | 705/16 |
| 2002/0199119 A1* | 12/2002 | Dunnion | ............. | H04L 63/0428 |
| | | | | 726/4 |
| 2006/0020811 A1* | 1/2006 | Tan | ....................... | H04L 63/067 |
| | | | | 713/180 |
| 2006/0206709 A1* | 9/2006 | Labrou | ................... | G06Q 20/18 |
| | | | | 713/167 |
| 2008/0046362 A1* | 2/2008 | Easterly | ................ | G06Q 20/04 |
| | | | | 705/40 |

(Continued)

*Primary Examiner* — Steven S Kim
*Assistant Examiner* — Timothy Paul Sax
(74) *Attorney, Agent, or Firm* — Ziegler IP Law Group, LLC (57) ABSTRACT

A system for implementing at least one cryptocurrency transaction at a point-of-sale by using a mobile terminal is provided. The system is operable to provide authentication for implementing the one or more cryptocurrency transactions, wherein the system is operable to send at least one authentication request for the at least one cryptocurrency transaction from a payment terminal to a payment service hosted via one or more virtual computing machines, wherein the payment service is operable to provide a request for a PIN code at the mobile terminal; to send the PIN code from the mobile terminal via a secure channel to open a vault in the one or more virtual machines, wherein the vault contains one or more private keys which are useable for authenticating the at least one cryptocurrency transaction; and to confirm execution of the at least one cryptocurrency transaction to at least the payment terminal.

11 Claims, 5 Drawing Sheets

(56) References Cited

U.S. PATENT DOCUMENTS

| | | | | |
|---|---|---|---|---|
| 2008/0189186 A1* | 8/2008 | Choi | G06Q 20/12 |
| | | | 705/26.35 |
| 2008/0195947 A1* | 8/2008 | Matsutani | G06F 17/30749 |
| | | | 715/716 |
| 2010/0138861 A1* | 6/2010 | Hong | H04H 60/22 |
| | | | 725/39 |
| 2012/0078737 A1* | 3/2012 | Kulakowski | G06Q 20/20 |
| | | | 705/16 |
| 2013/0268438 A1* | 10/2013 | Boyle | G06Q 20/381 |
| | | | 705/44 |
| 2014/0279422 A1* | 9/2014 | Holman | G06Q 20/12 |
| | | | 705/39 |
| 2015/0088733 A1* | 3/2015 | Monastyrsky | G06Q 20/382 |
| | | | 705/39 |
| 2015/0287026 A1* | 10/2015 | Yang | G06Q 20/3678 |
| | | | 705/69 |

* cited by examiner

SYSTEM AND METHOD FOR EXECUTING FINANCIAL TRANSACTIONS

TECHNICAL FIELD

The present disclosure relates to systems for executing financial transactions, for example in respect of executing bitcoin financial transactions, namely for executing secure payments employing block-chain-based technologies such as Bitcoin. Moreover, the present disclosure concerns methods of executing financial transactions, for example in respect of executing bitcoin financial transactions. Furthermore, the present disclosure relates to computer program products comprising non-transitory computer-readable storage media having computer-readable instructions stored thereon, the computer-readable instructions being executable by a computerized device comprising processing hardware to execute aforesaid methods.

BACKGROUND

"Bitcoin" is a known contemporary peer-to-peer (P2P) payment system introduced as open source software in the year 2009 by a developer Satoshi Nakamoto. The Bitcoin payment system is operable such that payments in the system are recorded in a public ledger using its own unit of account, known as "bitcoin". On account of "bitcoin" being not exactly the same as "real" money, for example fiat currencies such as the US dollar and the Euro, bitcoin is nevertheless commonly referred to as a "digital currency", a "virtual currency", electronic money, or "cryptocurrency". The bitcoin system is not controlled by a single entity, such as a central bank, which has led the US Treasury to call bitcoin a "decentralized currency". Moreover, on account of bitcoins being susceptible to being transferred directly from one person to another, the bitcoins are sometimes described as being "digital cash".

Bitcoins are created as a payment reward for processing work; such processing work involves users offer their computing power to verify and record payments into a public ledger associated with Bitcoin. Moreover, such processing work is referred as "mining", wherein, in practice, individuals or companies engage in processing work in exchange for transaction fees and newly created bitcoins. Besides mining, bitcoins can be obtained in exchange for other currencies, products and/or services. Moreover, users can send and receive bitcoins electronically for an optional transaction fee using wallet software executable on a personal computer, on a mobile communication device, or via use of a web application, for example.

Bitcoin as a form of payment for products and services has recently experienced growth. However, the European Banking Authority has warned that bitcoins lack consumer protections; bitcoins can be stolen, and chargebacks are impossible in an event of theft occurring. Commercial use of bitcoin is presently small compared to its use by financial speculators.

In the aforementioned bitcoin system, an important element is a ledger. The ledger records financial transactions which have been executed using bitcoins. Recording such financial transactions is accomplished without an intermediation of any single, central authority. Instead, multiple intermediaries exist in a form of computer servers executing bitcoin software. These computer servers form a network connected via the Internet, wherein anyone can potentially join the network. Transactions accommodated by the network are of a form: "payer A wants to send Z bitcoins to payee B", wherein the transactions are broadcast to the network using readily available software applications. The computer servers function as Bitcoin servers that are operable to validate these financial transactions, add a record of them to their copy of the ledger, and then broadcast these ledger additions to other servers of the network.

Just as a ledger can be used to record transfers of conventional fiat money such as US dollars, all bitcoin transfers are recorded in a computer file that acts as a ledger called a "block chain". Whereas a conventional ledger records a transfer of actual dollar bills or promissory notes that exist apart therefrom, bitcoins are simply entries in a block chain and do not exist outside the block chain. However, this then requires that the integrity and accuracy of entries in the block change have to be reliable in order for the Bitcoin system to function in practice.

Maintaining the block chain is referred to as "mining", and those who do such maintenance are rewarded with newly created bitcoins and transaction fees as aforementioned. Miners may be located on any of Earth's continents and process payments by verifying each transaction as valid and adding it to the block chain; such verification is achieved via consensus provided by a plurality of miners, and assumes that there is no systematic collusion. In the year 2014, payment processing was contemporarily rewarded with twenty five newly created bitcoins per block added to the block chain. To claim a reward for mining, a special transaction called a coinbase is included with the processed payments. All bitcoins in circulation can be traced back to such coinbase transactions. There is thus employed a bitcoin protocol which specifies that the reward for miners adding a block will be halved to 12.5 bitcoins in the year 2017, and halved again approximately every four years. Eventually, the reward will be removed entirely when an arbitrary limit of 21 million bitcoins is reached in circa year 2140, and transaction processing will then be rewarded solely by transaction fees. Paying a transaction fee is optional, but may speed up confirmation of the transaction executed in bitcoins. Payers of bitcoins have an incentive to include transaction fees because their transactions will likely be added to the block chain sooner; miners can choose which transactions to process and prefer to include those that pay fees.

Ownership of bitcoins associated with a certain bitcoin address can be demonstrated with knowledge of a private key belonging to the address. For a given owner, it is important to protect the private key from loss or theft. If a private key of a given user is lost, the given user cannot prove ownership by any other means. The bitcoins are then lost and cannot be recovered. Since anyone with knowledge of the private key has ownership of any associated bitcoins, theft occurs when a private key is revealed or stolen. Thus, a technical problem addressed by the present disclosure is how to trade more readily in bitcoins, and yet maintain a high degree of security in respect of such private keys.

The public nature of bitcoin means that, while those who use it are not identified by name, linking transactions to individuals and companies is feasible. Moreover, many jurisdictions require exchanges, where users can buy and sell bitcoins for cash, to collect personal information. In order to obfuscate a link between users and their transactions, some users employ a different bitcoin address for each transaction and other users rely on "mixing services" that allow users to trade bitcoins whose transaction history implicates them for coins with different transaction histories.

Bitcoins can be bought and sold in respect of many different types of contemporary fiat currencies, for example from individuals and companies. A contemporarily fast way to purchase bitcoins is in person or at a bitcoin ATM for cash. Participants in online exchanges offer bitcoin buy and sell bids. Using an online exchange to obtain bitcoins entails some risk, and according to one study, 45% of exchanges fail and take client bitcoins with them. Since bitcoin transactions are irreversible, sellers of bitcoins must take extra measures to ensure they have received contemporary fiat currency funds from an associated buyer.

In the Bitcoin system, bitcoins can be kept in wallets, in a manner somewhat akin to contemporary fiat currencies. Whereas bitcoin wallets are often described as being a place to hold or store bitcoins, due to the nature of the Bitcoin system, bitcoins are inseparable from the block chain transaction ledger, as aforementioned. Thus, a bitcoin wallet is something " . . . that stores digital credentials for a given user's bitcoin holdings . . . " and allows the given user to access and spend them. The Bitcoin system utilizes public-key cryptography, in which two cryptographic keys, one public key and one private key, are generated. The public key can be thought of as being an account number, and the private key can be thought of as being ownership credentials. At its most basic, a bitcoin wallet is a collection of these keys. However, most bitcoin software also includes a functionality to make bitcoin transactions, Bitcoin wallet software, sometimes referred as being "bitcoin client software", allows a given user to transact bitcoins. A wallet program generates and stores private keys, and communicates with peers on the bitcoin network. A first wallet program called "Bitcoin-Qt" was released in the year 2009 by Satoshi Nakamoto as open source code; Bitcoin-Qt is also sometimes referred to as "Satoshi client". The wallet program can be used as a desktop wallet for payments or as a server utility for merchants and other payment services. Moreover, Bitcoin-Qt is sometimes referred to as being the reference client, because it serves to define a bitcoin protocol and acts as a standard for other implementations. As of version 0.9, Bitcoin-Qt has been renamed "Bitcoin Core" to describe its role in the Bitcoin network more accurately; when making a purchase with a mobile communication device, for example a smart phone, QR codes are used ubiquitously to simplify transactions. Several server software implementations of the bitcoin protocol exist. So-called full nodes on the Bitcoin network validate transactions and blocks they receive, and relay them to connected peers for providing consensus verification of bitcoin transactions.

An important issue in relation to bitcoin security is the prevention of unauthorized transactions occurring in respect of a given user's bitcoin wallet. A bitcoin transaction permanently transfers ownership of a bitcoin to a new address, wherein the transaction has an associated data string having a form of random letters and numbers derived from public keys by application of a hash function and encoding scheme. The corresponding private keys act as a safeguard for the given user; a valid payment message from an address must contain an associated public key and a digital signature proving possession of the associated private key. As anyone with a private key can spend all of the bitcoins associated with the corresponding address, protection of private keys is very important in the Bitcoin system. Loss of a private key potentially results in theft; a risk of theft occurring can be reduced by generating keys offline on an uncompromised computer and saving them on external storage devices or paper printouts.

A first bitcoin ATM was installed in October 2013 in Vancouver, British Columbia, Canada. By 23 Nov. 2013, the total market capitalization of bitcoin exceeded US$10 billion. Growth of the bitcoin supply is predefined by the bitcoin protocol. Presently, there are over twelve million bitcoins in circulation with an approximate creation rate of twenty five bitcoins every ten minutes. The total supply of bitcoins is capped at an arbitrary limit of twenty one million bitcoins, and every four years the creation rate of bitcoins is halved. This means new bitcoins will continue to be released for more than a hundred years.

Financial journalists and analysts, economists, and investors have attempted to predict a possible future value of bitcoin. When bitcoins potentially attain a very high value per bitcoin, relative to known fiat currencies such as USD and Euro, executing small purchases via use of bitcoins, for example in shops, boutiques and cafeterias, becomes a technical problem.

A theft of a given bitcoin is an unauthorized transfer from a bitcoin address using an associated private key to unlock the address. On account of bitcoin transactions being irreversible and the identity of users difficult to unmask, it is rare that stolen bitcoins are recovered and returned. Theft occurs on a regular basis despite claims made by the Bitcoin Foundation that theft is impossible. However, as aforementioned, generating and storing keys offline mitigates the risk of theft. Most large-scale bitcoin thefts occur at exchanges or online wallet services that store the private keys of many users. A thief hacks into an online wallet service by finding a bug in its website or spreading malware to computers holding the private keys.

Bitcoin-related malware includes software that steals bitcoins from users by using a variety of techniques, for example by employing software that uses infected computers to mine bitcoins, and different types of ransomware, which disable computers or prevent files from being accessed until some payment is made. Security company Dell SecureWorks had, in February 2014, allegedly identified 146 types of bitcoin malware; about half of such malware is undetectable with standard antivirus scanners.

Some malware can steal private keys for bitcoin wallets allowing the bitcoins themselves to be stolen. The most common type of malware searches computers for cryptocurrency wallets to upload to a remote server where they can be cracked and their bitcoins stolen. Many of these also log keystrokes to record passwords, often avoiding the need to crack the keys. A different approach detects when a bitcoin address is copied to a clipboard and quickly replaces it with a different address, tricking people into sending bitcoins to the wrong address. This method is effective for stealing bitcoins, because bitcoin transactions are irreversible, as aforementioned.

The Bitcoin network itself is potentially vulnerable to attack and corruption, as will now be elucidated. There are two main ways the blockchain ledger can be corrupted to steal bitcoins, namely by fraudulently adding to or modifying it. The Bitcoin system protects the blockchain against both using a combination of digital signatures and cryptographic hashes.

Payers and payees using the Bitcoin system are identified in the blockchain by their public cryptographic keys. Most contemporary bitcoin transfers are from one public key to a different public key; in practice hashes of these keys are used in the blockchain, and are called "bitcoin addresses". In principle, a hypothetical attacker person A could steal money from person B and person C by simply adding transactions to the blockchain ledger like "person B pays person A 100 bitcoins", "person C pays person A 200 bitcoins", and so on, using of course these users' bitcoin addresses instead of their names. The bitcoin protocol prevents this kind of theft by requiring every transfer to be digitally signed with the payer's private key; only signed transfers can be added to the blockchain ledger. Since person A cannot forge person Bs signature, person A cannot defraud person B by adding an entry to the blockchain equivalent to "person B pays person A 200 bitcoins". At the same time, anyone can verify person B's signature using his/her public key, and therefore that he/she has authorized any transaction in the blockchain where he/she is the payer.

Another principal manner in which to steal bitcoins is to modify blockchain ledger entries. Aforementioned person A could buy something from person B, like a digital church organ or a yacht, by adding a signed entry to the blockchain ledger equivalent to person A pays person B 200 bitcoins. Later, after receiving the digital church organ or yacht, person A could modify that blockchain ledger entry to read instead: "person A pays person B 2 bitcoins", or even delete the entry. Digital signatures cannot prevent this attack: person A can simply sign his/her entry again after modifying it.

To prevent modification attacks, the Bitcoin system first requires entries be added to the blockchain in groups or blocks, not one at a time. More importantly, each block must be accompanied by a cryptographic hash of three things:
(i) a hash of the previous block;
(ii) the block itself; and
(iii) a number called a nonce.

A hash of only the first two items will, like any cryptographic hash, always have a fixed number of bits, for example 256 for SHA-256. The nonce is a number which, when included, yields a hash with a specified number of leading zero bits. On account of cryptographic hashes being essentially random, in the sense that their output cannot be predicted from their inputs, there is only one known way to find the nonce: to try out integers one after the other, for example 1, then 2, then 3, and so on. This process is called "mining". The larger the number of leading zeros, the longer on average it will take to find a requisite nonce. The Bitcoin system constantly adjusts the number of leading zeros, so that the average time to find a nonce is about ten minutes. That way, as processing capabilities of computing hardware increase with time, over the years, the bitcoin protocol will simply require more leading zero bits to make mining always take a duration of about ten minutes to implement.

This Bitcoin system prevents modification attacks, in part, because an attacker has to recalculate all the hashes of the blocks after the modified one. In the example above, if person A wants to change 200 bitcoins to 2 bitcoins, he/she will not only have to recompute the hash of the block in which the transaction is recorded, but also compute the hash of all the blocks that come after it; he/she will have to recreate the chain of blocks, which is extremely difficult. He/she can do this, but it will take him/her time, about ten minutes on average per block. However, during that time, the network will continue to add blocks, and it will do so much faster than person A can mine. Person A would have to recalculate all the blocks before the network could add a new one, or at least catch up with or overtake the network's miners. To do this, he/she would have to have roughly as much computing power as a majority of the existing bitcoin miners combined. This would be very expensive and, if the bitcoin network were large enough, likely infeasible to implement. Moreover, because of financial incentives to mine described below, it will make more financial sense for person A to devote his/her resources to normal bitcoin mining instead. Thus, the Bitcoin system protects against fraudulent blockchain modifications by making them expensive and, if a given attacker is rational, unappealing because it makes less financial sense than becoming a miner. These attacks become more expensive and less feasible as the number of miners increases, making the whole Bitcoin system become even more secure.

The Bitcoin system is based on an innovative solution of a problem common to all digital currency and payment schemes, namely "double-spending". With paper money or physical coins, when a given payer transfers money to a given payee, the payer cannot keep a copy of that dollar bill or coin. With digital money, which is just a computer file, this is not the case, and the payer could in principle spend the same money again and again, repeatedly copying of the file. With bitcoin, when person A offers to pay person C some bitcoins, person C can always first check the blockchain ledger to verify that person A actually owns that many bitcoins. Of course, person A could try to pay many people simultaneously, but the Bitcoin system can defend against that. If person A offers to pay person C some bitcoins in exchange for goods, person C can stipulate that he/she will not deliver the goods until person A's payment to person C appears in the blockchain, which typically involves waiting about ten minutes. However, such a long period of waiting is inappropriate when making small purchases using bitcoins, for example in a boutique, ticket office or cafeteria.

A race attack in the Bitcoin system can potentially occur as follows: if the bitcoin transaction has no confirmations, shops and services which accept payment via bitcoins can be exposed to a "race attack". For example, two bitcoin transactions are created for the same funds to be sent to different shops/services. Bitcoin system rules ensure that only one of those bitcoin transactions can be added to the block chain. Shops can take numerous precautions to reduce this type of race attack.

In an event of a Finney attack in the Bitcoin system, shops or services which accept bitcoin transactions without any confirmation are affected. A Finney attack is an attack which requires the participation of a miner to premine a block, and then send the bitcoin money to be defrauded back to the fraudster. The risk of such an attack cannot be reduced to nothing, regardless of preventative measures taken by shops or services, but it does require the participation of a miner and an ideal combination of contributing factors. Potentially, the miner risks a potential loss of the block reward. In a similar manner to the race attack, the shop or service must seriously consider its policies concerning bitcoin transactions which are implemented without any confirmation.

In a "Vector76" attack, namely an attack with confirmation, this is a combination of the two aforementioned attacks, which gives a perpetrator an ability to spend funds twice simply by employing a confirmation. Moreover, in a brute force attack, the brute force attack is possible, even if the shop or service is expecting several transaction confirmations. It requires the attacker to be in possession of relatively high-performance hardware, capable of functioning at a hash frequency. In the brute force attack, the attacker sends a bitcoin transaction to the shop paying for a product/service, and at the same time continues looking for a connection in the block chain, namely for a block chain fork, which recognizes this transaction. After a certain number of confirmations, the shop sends the product. If the attacker has found more than N blocks at this point, he/she breaks his/her block chain fork and regains his/her money, but if the attacker has not succeeded in doing this, the attack can be deemed a failure and the funds are sent to the shop, as should be the case. The success of this brute force attack depends on the speed, namely the hash frequency, of the attacker and the number of confirmations for the shop/service. For example, if the attacker possesses 10% of the calculation power of the bitcoin network and the shop expects 6 confirmations for a successful transaction, the probability of success of such a brute force attack will be 0.1%.

It will be appreciated from the foregoing that the Bitcoin system has several potential weaknesses when employed in practice to make payments. However, increasingly, users are desirous to use bitcoins to make small everyday payments, for example in shops, in boutiques, and in cafeterias. Contemporary mobile Bitcoin payment systems are based on multiple steps and require mobile application software ("apps") to be downloaded into a mobile wireless communication device, for example a smart phone, and a mobile Internet connection to be available. Moreover, bitcoin transaction authentication, as described in the foregoing, requires time and significant amount of communication resources. Furthermore, authorization of Bitcoin-based transactions takes a long time and involves multiple steps, namely:
(i) payment with bitcoins involves multiple steps to be performed by a given user;
(ii) payment with bitcoins takes a long time to implement securely; and
(iii) payment with bitcoins is not user-friendly.

SUMMARY

The present invention seeks to provide a system and associated method which are more secure when making payments, for example using a mobile wireless communication device such as a smart phone.

According to a first aspect, there is provided a system as defined in appended claim 1: there is provided a system for implementing at least one cryptocurrency transaction at a point-of-sale by using a mobile terminal, wherein the system is operable to provide authentication for implementing the one or more cryptocurrency transactions, characterized in that the system is operable:
(a) to send at least one authentication request for the at least one cryptocurrency transaction from a payment terminal to a payment service hosted via one or more virtual computing machines, wherein the payment service is operable to provide a request for a Personal Identification Number (PIN) code at the mobile terminal;
(b) to send the PIN code from the mobile terminal via a secure channel to open a vault in the one or more virtual machines, wherein the vault contains one or more private keys (PK) which are useable for authenticating the at least one cryptocurrency transaction; and
(c) to confirm execution of the at least one cryptocurrency transaction to at least the payment terminal.

The invention is of advantage in that using the mobile terminal via its PIN code to control one or more private keys for authentication in a proxy manner, via at least one virtual machine, is capable of enabling more secure cryptocurrency transactions.

Optionally, in the system, the secure channel is implemented via at least one secure Unstructured Supplementary Service Data (USSD) channel.

Optionally, in the system, the one or more private keys (PK) are stored in non-volatile memory of the one or more virtual computing machines, and are read therefrom to random access memory (RAM) for use as an authentication script in a cryptocurrency transaction authentication session for implementing the at least one cryptocurrency transaction.

Optionally, in the system, the non-volatile memory is implemented as hard disk memory of the one or more virtual computing machines. Further optionally, in the system, the one or more private keys (PK) are stored in an encrypted state in the non-volatile memory, and are decrypted using the PIN code to generate the authentication script for use in authenticating the one or more cryptocurrency transactions.

Optionally, in the system, the one or more private keys decrypted and read to the random access memory (RAM) are deleted therefrom after the at least one cryptocurrency transaction has been authenticated.

Optionally, the system is operable to implement the at least one cryptocurrency transaction using a bitcoin cryptocurrency.

Optionally, in the system, the payment terminal and the mobile telephone are provided with a near-field communication arrangement for mutually communicating via the near-field communication arrangement, when initiating the at least one cryptocurrency transaction. More optionally, in the system, the near-field communication arrangement is implemented using a radio frequency identification (RFID) apparatus associated with the payment terminal and the mobile terminal. "Near-field communication" pertains to relatively low-power, for example mW radiation power level, communication having a communication range of less than 100 meters, more optionally having a communication range of less than 10 meters.

According to a second aspect, there is provided a method of using a system for implementing at least one cryptocurrency transaction at a point-of-sale by using a mobile terminal, wherein the system is operable to provide authentication for implementing the one or more cryptocurrency transactions, characterized in that the method includes:
(a) sending at least one authentication request for the at least one cryptocurrency transaction from a payment terminal to a payment service hosted via one or more virtual computing machines, wherein the payment service is operable to provide a request for a Personal Identification Number (PIN) code at the mobile terminal;
(b) sending the PIN code from the mobile terminal via a secure channel to open a vault in the one or more virtual machines, wherein the vault contains one or more private keys (PK) which are useable for authenticating the at least one cryptocurrency transaction; and
(c) confirming execution of the at least one cryptocurrency transaction to at least the payment terminal.

Optionally, the method includes implementing the secure channel via at least one secure USSD channel.

Optionally, the method includes storing the one or more private keys (PK) in non-volatile memory of the one or more virtual computing machines, and reading the one or more private keys (PK) therefrom to random access memory (RAM) for use as an authentication script in a cryptocurrency transaction authentication session for implementing the at least one cryptocurrency transaction.

Optionally, the method includes implementing the non-volatile memory as hard disk memory of the one or more virtual computing machines.

Optionally, the method includes storing the one or more private keys (PK) in an encrypted state in the non-volatile memory, and decrypting the one or more private keys (PK) using the PIN code to generate the authentication script for use in authenticating the one or more cryptocurrency transactions.

Optionally, the method includes deleting the read one or more decrypted private keys from the random access memory (RAM) after the at least one cryptocurrency transaction has been authenticated.

Optionally, the method includes operating the system to implement the at least one cryptocurrency transaction using a bitcoin cryptocurrency.

Optionally, the method includes providing the payment terminal and the mobile telephone with a near-field communication arrangement for mutually communicating via the near-field communication arrangement, when initiating the at least one cryptocurrency transaction. More optionally, the method includes implementing the near-field communication arrangement using RFID apparatus associated with the payment terminal and the mobile terminal.

According to a third aspect of the invention, there is provided a computer program product comprising a non-transitory computer-readable storage medium having computer-readable instructions stored thereon, the computer-readable instructions being executable by a computerized device comprising processing hardware to execute a method of the second aspect.

It will be appreciated that features of the invention are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

Embodiments of the disclosure will now be described in greater detail, wherein technical terms and phrases used to describe the embodiments are elucidated in Table 1.

TABLE 1

Terms and phrases used to described embodiments of the disclosure

| Term or phrase | Detailed explanation |
| --- | --- |
| Address | A Bitcoin address is similar to a physical address or an e-mail. It is the only information that is needed to provide for a first user to pay a second user with Bitcoin. An important difference, however, is that each address should only be used for a single transaction. |
| Bitcoin | Bitcoin - with capitalization "B" - is used when describing a concept of Bitcoin, or an entire network itself, for example "I was learning about the Bitcoin protocol today." |
| bitcoin | bitcoin - without capitalization "b", is used to describe bitcoins as a unit of account, for example "I sent ten bitcoins today"; it is also often abbreviated to BTC or XBT. |

TABLE 1-continued

Terms and phrases used to described embodiments of the disclosure

| Term or phrase | Detailed explanation |
| --- | --- |
| Block | A block is a record in a block chain that contains and confirms many waiting bitcoin transactions. Roughly every 10 minutes, on average, a new block including transactions is appended to the block chain through mining, as described in the foregoing. |
| Block Chain | A block chain is a public record of Bitcoin transactions in a chronological order. The block chain is shared between all Bitcoin users. It is used to verify the permanence of Bitcoin transactions and to prevent double spending, as aforementioned. |
| BTC | BTC is the common unit of Bitcoin currency. It can be used in a similar way to USD for US dollar instead of $. |
| Confirmation | Confirmation means that a transaction has been processed by the Bitcoin network and is highly unlikely to be reversed. Bitcoin transactions receive a confirmation when they are included in a block and for each subsequent block. Even a single confirmation can be considered secure for low value transactions, although for larger amounts such as 1000 USD, it is recommended to wait for 6 confirmations or more. Each confirmation exponentially decreases a risk of a reversed bitcoin transaction occurring. |
| Cryptography | Cryptography is the branch of mathematics that allows creation of mathematical proofs that provide high levels of security. Online commerce and banking already use cryptography. In the case of Bitcoin, cryptography is used to make it substantially impossible for a given user to spend funds from another user's wallet or to corrupt the block chain. It can also be used to encrypt a wallet, so that it cannot be used without a password. |
| Double Spend | If a malicious user tries to spend their bitcoins in respect of two or more different recipients at the same time, this is referred as being "double spending". Bitcoin mining and the block chain are there to create a consensus on the Bitcoin network about which of the two or more transactions will confirm and be considered valid. |
| Hash Rate | The hash rate is the measuring unit of the processing power of the Bitcoin network. The Bitcoin network must make intensive mathematical operations for security purposes. When the network reaches a hash rate of 10 Th/s, this means it could make 10 trillion calculations per second. |
| Mining | Bitcoin mining is the process of making computer hardware do mathematical calculations for the Bitcoin network to confirm transactions and increase security. As a reward for their services, Bitcoin miners can collect transaction fees for the transactions they confirm, along with newly created bitcoins. Mining is a specialized and competitive market where the rewards are divided up according to how much calculation is done. Not all Bitcoin users do Bitcoin mining, and it is not an easy way to make money. |
| P2P | Peer-to-peer refers to systems that function in a manner akin to an organized collective by allowing each individual to interact directly with other individuals. In the case of Bitcoin, the Bitcoin network is built in such a way that each user is broadcasting bitcoin transactions of other users. Moreover, importantly, no bank, for similar centralized institution, is required as a third party. |
| Private Key | A private key is a secret piece of data that proves a given user's right to spend bitcoins from a specific wallet through a cryptographic signature. The given user's private key(s) are stored in the given user's computer, if the given user employs a software wallet; they are stored on some remote servers if the given user uses a web wallet. Private keys must never be revealed to third parties, as they allow users to spend bitcoins for their respective Bitcoin wallets. |
| Signature | A cryptographic signature is a mathematical mechanism that allows someone to prove ownership. In the case of Bitcoin, a Bitcoin wallet and its private key(s) are linked by some mathematical relationship. When a given user's Bitcoin software signs a transaction with an appropriate private key, the whole Bitcoin network is able to detect that the signature matches the bitcoins being spent. However, it is very difficult for third parties to guess a given user's private key to steal the given user's hard-earned bitcoins. |

TABLE 1-continued

Terms and phrases used to described embodiments of the disclosure

| Term or phrase | Detailed explanation |
| --- | --- |
| Wallet | A Bitcoin wallet is loosely an equivalent of a physical wallet on the Bitcoin network. The wallet actually contains an associated user's private key(s) which allow the user to spend the bitcoins allocated to it in the block chain. Each Bitcoin wallet can show the user the total balance of all bitcoins it controls and lets the user pay a specific amount to a specific person, in a manner akin to a real physical wallet. This is different to credit cards where users of the credit cards are charged by one or more merchants with whom they are transacting. |

Figure 1:
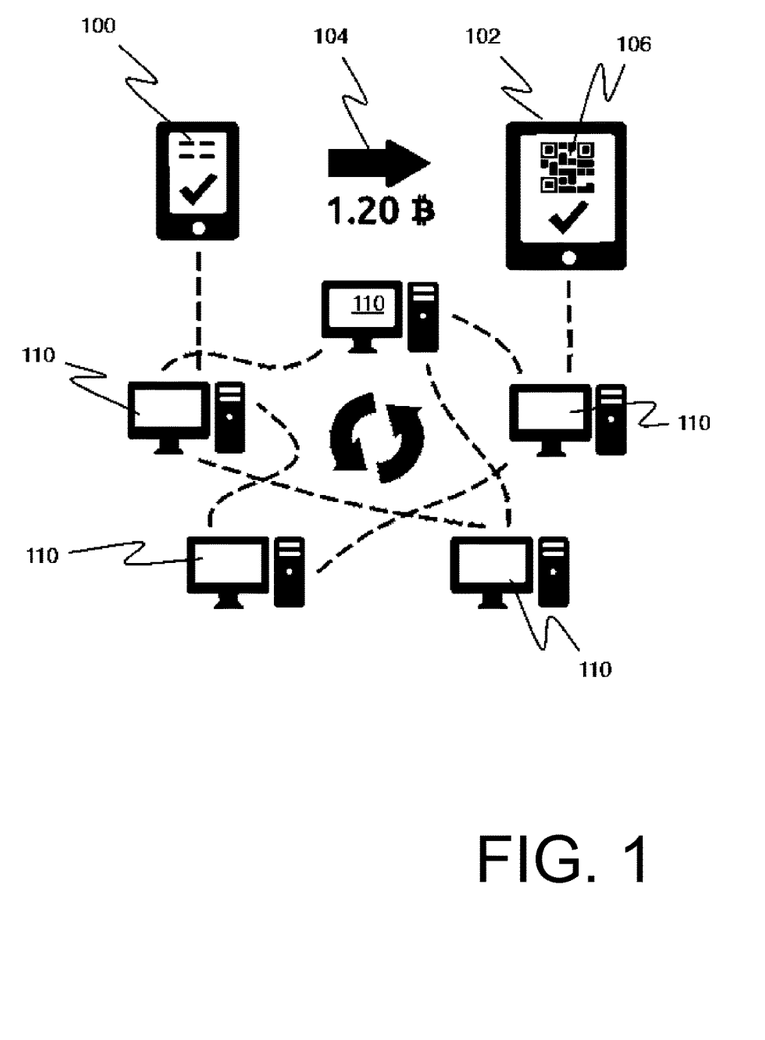
FIG. 1 is an illustration of a high-level architecture representing a manner of Bitcoin system operation.

Referring to FIG. 1, there is shown an illustration of a high-level architecture representing a manner of Bitcoin system operation. In the architecture, a first user is associated with a user terminal 100; optionally, the user terminal 100 is implemented via use of portable computing hardware, for example a smart phone, a laptop computer, a tablet computer. For example, the tablet computer is a proprietary iPad, but not limited thereto; "iPad" is a trademark of Apple Corp. The first user is desirous, for example, to transfer 1.2 bitcoins 104 to a second user with a user terminal 102. The user terminal 102 has a QR-code 106 presented in a graphical screen, wherein the QR-code 106 indicates a destination address, namely a Bitcoin address, of the payment of the 1.2 bitcoins; the destination address is, in practice, the second user's Bitcoin account details. Before implementing the transfer of 1.2 bitcoins, the first and second users of the terminals 100, 102 respectively, have set up their associated Bitcoin wallets.

The user terminal 100 submits the bitcoin transfer to a peer-to-peer (P2P) network consisting of a plurality of computers 110; optionally, the plurality of computers 110 is implemented using at least one of: laptop computers, desktop computers, servers. Optionally, the plurality of computers 110 is mutually connected via the Internet, although other types of communication networks are alternatively or additionally employ for providing mutual connections.

As aforementioned, the architecture in FIG. 1 implements a Bitcoin system, which is based upon a block chain. The block chain is a shared public ledger upon which an entire network of the Bitcoin system relies. All confirmed bitcoin transactions are included in the block chain. By employing such an approach, spendable balances for Bitcoin wallets can be calculated, and new bitcoin transactions can be verified to be spending bitcoins that are actually owned by a given spender, namely spending user. The integrity and a chronological order of the block chain are enforced by employing cryptographic methods.

During a transaction pertaining to the 1.2 bitcoins 104, a transfer of value between Bitcoin wallets, from the first user 100 to the second user 102, is included, namely recorded, in the blockchain. Bitcoin wallets keep a secret piece of data referred to as a private key or seed, which is used to sign bitcoin transactions, providing a mathematical proof that they have come from an owner of a given wallet. The signature also prevents the bitcoin transaction from being altered by any third party users once it has been issued. All bitcoin transactions are broadcast between users via the network consisting of the plurality of computers 110, and the bitcoin transactions usually begin to be confirmed by the network in a following 10 minutes after implementing the bitcoin transaction, through a process referred as "mining", as elucidated in the foregoing.

Mining is a distributed consensus system that is used to confirm waiting bitcoin transactions by including them in the block chain. Such mining enforces a chronological order in the block chain, protects the neutrality of the network, and allows different computers to agree on the state of the Bitcoin system. To be confirmed, bitcoin transactions must be packed in a block that conforms to very strict cryptographic rules that are verified by the network. These rules prevent previous blocks from being modified, because doing so would invalidate all following blocks. Mining also creates an equivalent of a competitive lottery that prevents any individual user from easily adding new blocks consecutively in the block chain. This way, no individual users can control what is included in the block chain, or replace parts of the block chain, to roll back their own spends.

Figure 2:
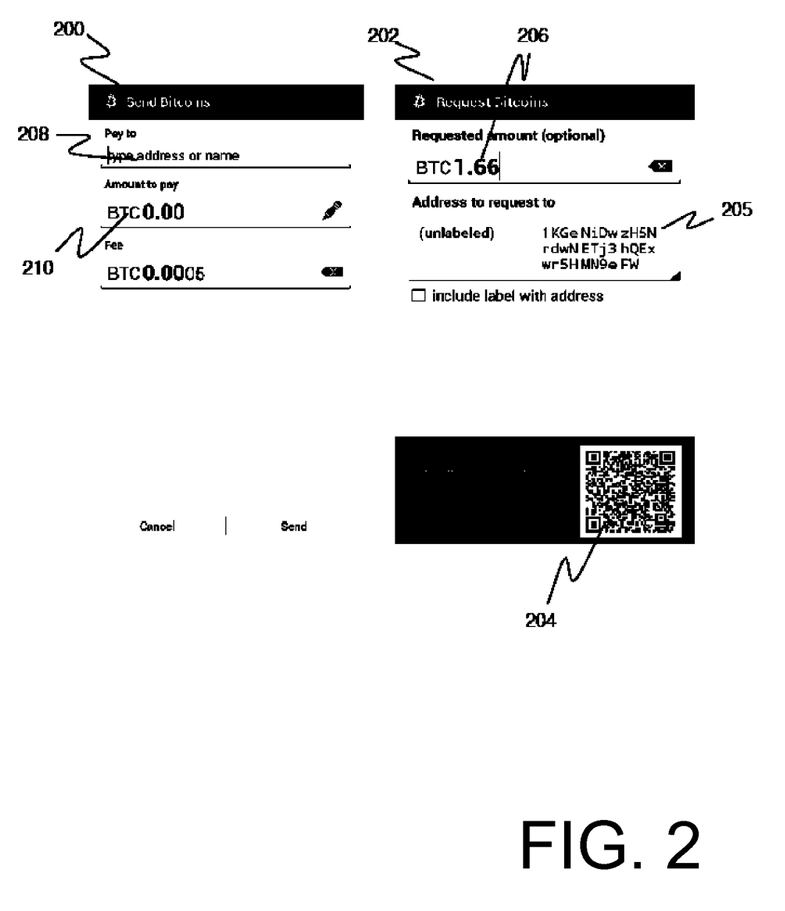
FIG. 2 is an illustration of an example user interface of a Bitcoin application executed upon computing hardware in a mobile terminal, for example a smart phone.

In FIG. 2, there is shown an example user interface of a Bitcoin application executed upon computing hardware in a mobile terminal, for example a smart phone. A user interface (UI) 200 is operable to present an example of whom to send bitcoins. The UI 200 includes a field 208 which is used to enter a bitcoin address of the bitcoin receiving user, and includes a field 210 which is employed to enter in an amount of bitcoins to be paid. A user interface (UI) 202 provides an example user application which is employed to request for Bitcoin payments. A field 206 is employed to show requested bitcoin amounts, and a field 205 is employed to input an address of the requester's bitcoin wallet. Moreover, the Bitcoin application optionally has a QR-code 204, which is optionally read by a given spending user to get bitcoin addresses and other information in a convenient manner.

Figure 3:
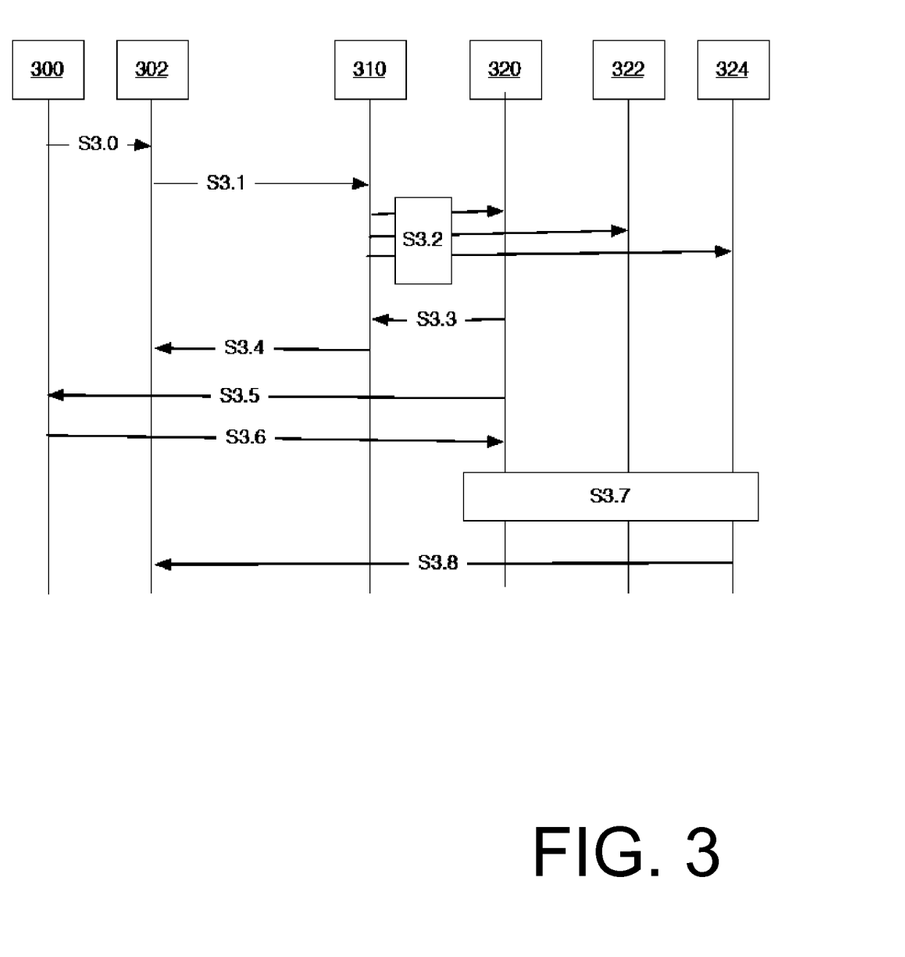
FIG. 3 is an illustration of a payment flow chart according to an embodiment of the present disclosure.

In FIG. 3, there is shown a payment flow chart according to embodiments of the present disclosure. In respect of the flow chart, a user has a mobile terminal 300, for example an Internet-enabled smart phone or tablet computer. The mobile terminal 300 has a radio frequency identification (RFID) tag either embedded into, or attached to, the mobile terminal 300, for example by way of a sticker. The RFID tag is optionally spatially separate from the mobile terminal 300. The flow chart as illustrated in FIG. 3 relates to the mobile terminal 300 and the RFID tag as single unitary entity.

In a step S3.0 of the flow chart, a user touches with the mobile terminal 300, for example via near-field communication, a payment terminal 302 at a point of sales. The payment terminal 302 also has a RFID reader associated therewith. However, it will be appreciated that other types of near-field communication are optionally alternatively, or additionally, employed for communicating directly between the mobile telephone 300 and the payment terminal 302, for example near-field optical communications and/or near-field acoustic communication (for example ultrasonic communication).

In a step S3.1 of the flow chart, the payment terminal 302 sends a communication to a payment server system 310. The payment server system 310 is optionally a single server, multiple servers, a cloud computing facility, and so forth. The communication includes a base identification (Base ID) associated with the mobile terminal 300. The Base ID is optionally, for example, a telephone number or other ID, such as a passport number, a social security number, a random number, and so forth. Moreover, the Base ID is also associated with the user, and a virtual machine of the user.

In a step S3.2 of the flow chart, the payment server system 310 sends a broadcast, or other communication message, to all, or some of, virtual machines (VM) 320, 322, 324 in the Bitcoin system. The virtual machines 320, 322, 324 can refer to Linux containers running in arbitrary locations and systems in the World Wide Web (www) or Internet, for example. Optionally, the virtual machines 320, 322, 324 (VM's) are hosted in a cloud service, wherein the cloud service is susceptible to being implemented, for example, using home computers, in mobile terminals, in desk top computers, and so forth.

In a step S3.3, a virtual machine (VM), with which the Base ID is associated, sends an acknowledgement "ack" to the request back to payment service system 310. The payment service system 310 then sends a confirmation that the mobile terminal 300 is in the system and bitcoin payment is pending approval from the user.

In a step S3.5, the virtual machine 320 sends a request to the payment service server, or other infra such as a carrier infra related store and forward network nodes (SMSC'e and so forth), to send a message to the mobile terminal 300. In one embodiment, the message is sent using a USSD channel of mobile communication, due to its robust nature. Alternatively, the message can be sent using a short messaging service (SMS) or over Internet Protocol (IP) connectivity. In some embodiments, push notifications such as an Apple push notification service can be used to send the message to the mobile terminal 300. Information content of the message concerns the user being invited to enter his or her PIN code via the mobile telephone 300.

USSD is an abbreviation for "Unstructured Supplementary Service Data" and concerns a protocol used by GSM cellular telephones, namely mobile telephones, to communicate with service providers' computers. Moreover, USSD is a gateway or channel which is a collection of hardware and software required to connect mutually two or more disparate networks, including performing protocol conversion. USSD gateways or channels maintain a single interactive session once a given connection is established; such a single interactive session is potentially secure and difficult for unauthorized third parties to eavesdrop.

In a step S3.6, the PIN code is communicated to the virtual machine 320, beneficially over a secure channel such as USSD, as aforementioned. The PIN code is used in the virtual machine 320 to initiate Bitcoin payment related steps. The PIN code is used to open a vault in the virtual machine 320. The vault has private keys of the user of the mobile terminal 300. The private keys are used to make the Bitcoin payment to the address communicated by the payment server 310 to the virtual machine, as requested earlier by the payment terminal 302. The payment address is, in practice, a Bitcoin address of the wallet of a merchant having the payment terminal 302.

In a step S3.7, the Bitcoin transaction is executed in a normal manner, as described in the foregoing. In the example, the bitcoin wallet of the merchant is running in a virtual machine 324. The virtual machine 324 is configured to send, in a step S3.8, a confirmation to the merchant terminal 302 when the bitcoin transaction is confirmed.

Figure 4:
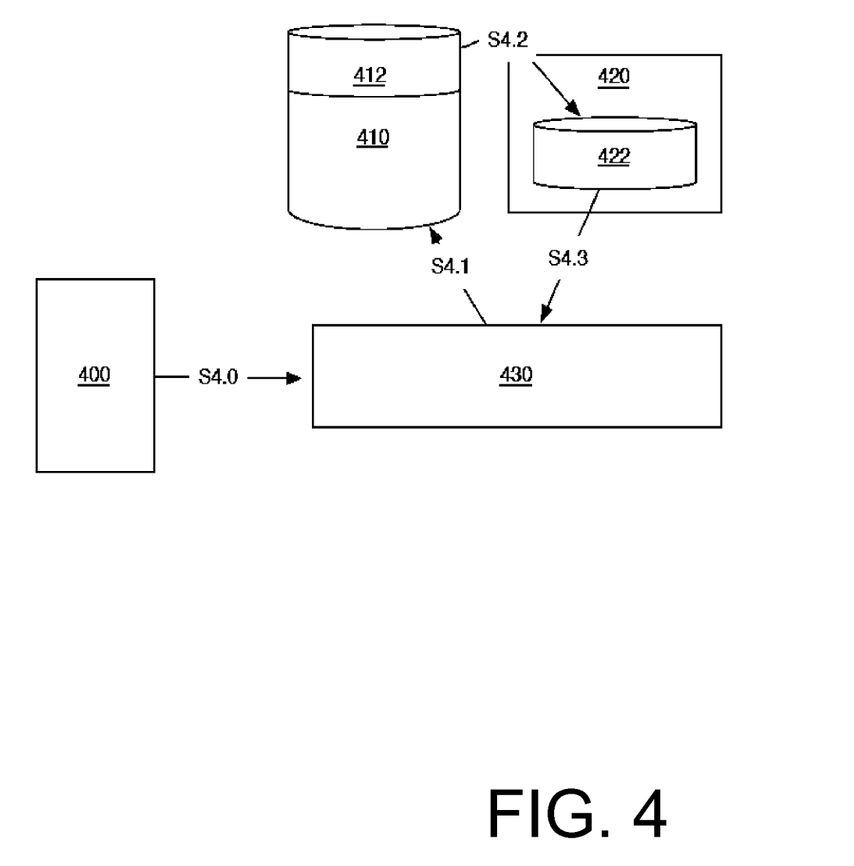
FIG. 4 is an illustration of an example regarding a manner in which to open private keys (PK) in a virtual machine.
Figure 5:
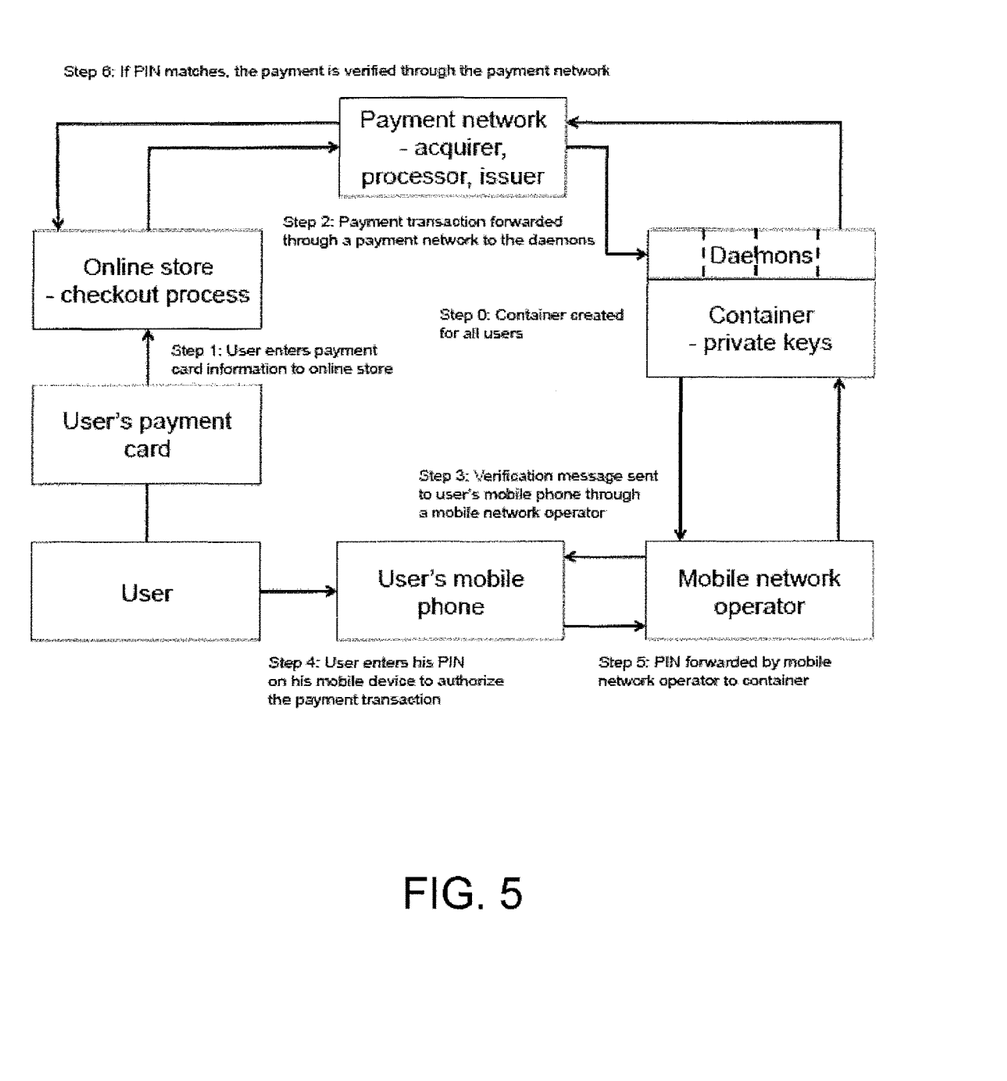
FIG. 5 is a flowchart illustrating one embodiment of a process incorporating aspects of the present disclosure.

In FIG. 4, there is shown an example regarding a manner in which to open private keys (PK) in a virtual machine. A PIN code is received from a mobile terminal 400 in a step S4.0. A computer program product, namely a software product, 430 executing in a Linux container of a computer system receives the PIN code and uses the PIN code to access an encrypted portion 412, namely a vault which is an encrypted area in non-volatile memory, for example hard disks of the computer system whereat the PK's are stored, of a hard disk 410, or other permanent data memory device. The encrypted portion is decrypted to random access memory (RAM) 420 of the computer in order to provide the private keys 422. The private keys 422 are used in a step S4.3 by the software 430 executing in the computer system. The private keys 422 are used to confirm the Bitcoin transaction. The RAM 420 is then emptied after using the private keys 422.

The invention will be further described with the help of two examples, which show how the present invention can be used.

EXAMPLE 1

Process Steps in Online Stores

Step 0: When the user creates his MONI account, MONI automatically creates a MONI ID container for him and saves his private keys into the container. MONI has daemons on top of the container and the daemons listen to their respective networks if the public keys are called.

Step 1: The MONI user initiates the payment transaction by entering his payment card number and information to the checkout process of an online store.

Step 2: The payment transaction is forwarded through the payment network (e.g. acquiring bank, processor and issuing bank) to the daemons which pick up the payment transaction. The issuing bank may tokenize the payment card number before broadcasting it to the daemons.

Step 3: MONI sends a verification message via the mobile network operator of the MONI user to his mobile phone. Verification message content example: "Authorize the payment to online store XXX for the amount 100.00 € by entering your PIN."

Step 4: The MONI user enters his PIN number on his mobile phone to authorize the transaction.

Step 5: The PIN authorization is forwarded by the mobile network operator to the container.

Step 6: If the PIN matches, the payment is verified through the payment network to the online store.

EXAMPLE 2

Process Steps in Voting

Step 0: When the user creates his MONI account, MONI automatically creates a container for him and saves his private keys into the container. MONI has daemons on top of the container and the daemons listen to their respective networks if the public keys are called.

Step 1: The MONI user initiates the voting transaction by entering his vote on a voting machine which may be an online service.

Step 2: The vote is forwarded to the daemons which pick up the vote which is to be verified.

Step 3: MONI sends a verification message via the mobile network operator of the MONI user to his mobile phone. Verification message content example: "Authorize your vote by entering your PIN."

Step 4: The MONI user enters his PIN number on his mobile phone to authorize the vote.

Step 5: The PIN authorization is forwarded by the mobile network operator to the container and if the PIN matches, the vote is verified to the voting machine or online voting system.

It will appreciated that transactions involving the Bitcoin system and bitcoin payment are provided as an example in the foregoing. However, embodiments of the present disclosure are not limited to "bitcoin" type payment methods, and can be used with other types of cryptocurrencies;

embodiments of the present disclosure are optionally employed for handling other types of transactions, as well as for purposes of verifying agreements between users.

Modifications to embodiments of the invention described in the foregoing are possible without departing from the scope of the invention as defined by the accompanying claims. Expressions such as "including", "comprising", "incorporating", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A system for authenticating and executing cryptocurrency transactions, the system comprising:
   an online store;
   a payment server; and
   one or more virtual computing machines, wherein the one or more virtual computing machines includes a memory comprising a vault;
   wherein a payment terminal of the online store is configured to receive a payment transaction request for a cryptocurrency transaction from a mobile terminal during a checkout process of the online store;
   wherein the payment server is programmed to:
      receive a communication from the online store and broadcast the communication to the one or more virtual computing machines, the communication including the payment transaction request and a payment address for the online store;
      receive a verification request from one of the one or more virtual computing machines and send the verification request to the mobile terminal, the verification request including a request for a personal identification number from the mobile terminal;
      send the personal identification number from the mobile terminal over a secure channel to the one or more virtual computing machines; and
   wherein the one or more virtual computing machines is configured to:
      authenticate and execute the cryptocurrency transaction corresponding to the payment transaction request using the personal identification number; and
      send a communication confirming execution of the cryptocurrency transaction to the online store.

2. The system as claimed in claim 1, wherein the secure channel comprises a secure Unstructured Supplementary Service Data channel.

3. The system as claimed in claim 1, wherein the one or more virtual computing machines is configured to store one or more private keys in non-volatile memory of the one or more virtual computing machines, and read the one or more private keys from the non-volatile memory to random access memory for use as an authentication script in a cryptocurrency transaction authentication session for implementing the cryptocurrency transaction.

4. The system as claimed in claim 3, wherein the non-volatile memory comprises a hard disk memory of the one or more virtual computing machines.

5. The system as claimed in claim 3, wherein the one or more private keys are stored in an encrypted state in the non-volatile memory of the one or more virtual computing machines, and the one or more virtual machines are configured to decrypt the one or more private keys using the personal identification number to generate the authentication script for use in authenticating the cryptocurrency transactions.

6. The system as claimed in claim 5, wherein the one or more virtual computing machines is configured to delete the one or more private keys, decrypted and read to the random access memory, from the random access memory after the cryptocurrency transaction has been authenticated.

7. The system as claimed in claim 1, wherein the system is configured to implement the cryptocurrency transaction using a bitcoin cryptocurrency.

8. A method of using a system for authenticating and executing a cryptocurrency transaction at a point-of-sale, the method comprising:
   receiving, by a payment terminal of an online store, a payment transaction request for the cryptocurrency transaction from a mobile terminal during a checkout process of the online store;
   receiving, by the payment server, a communication from the online store;
   broadcasting, by the payment server, the communication to one or more virtual computing machines, the communication including the payment transaction request and a payment address for the online store;
   receiving, by the payment server, a verification request from one of the one or more virtual computing machines;
   sending, by the payment server, the verification request to the mobile terminal, the verification request including a request for a personal identification number from the mobile terminal;
   sending, by the mobile terminal, the personal identification number over a secure channel to the one or more virtual computing machines;
   authenticating and executing, by the one or more virtual computing machines, the cryptocurrency transaction corresponding to the payment transaction request using the personal identification number; and
   sending, by the one or more virtual computing machines, a communication confirming execution of the at least one cryptocurrency transaction to the payment terminal of the online store.

9. The method as claimed in claim 8, wherein the method includes implementing the secure channel via at least one secure Unstructured Supplementary Service Data channel.

10. The method as claimed in claim 8, wherein the method further comprises:
   storing, by the one or more virtual machines, one or more private keys in non-volatile memory of the one or more virtual computing machines;
   reading, by the one or more virtual machines, the one or more private keys from the non-volatile memory to random memory for use as an authentication script in a cryptocurrency transaction authentication session for implementing the cryptocurrency transaction;
   implementing, by the one or more virtual machines, the non-volatile memory as hard disk memory of the one or more virtual computing machines;
   storing, by the one or more virtual machines, the one or more private keys in an encrypted state in the non-volatile memory;
   decrypting, by the one or more virtual machines, the one or more private keys using the personal identification number to generate the authentication script for use in authenticating the cryptocurrency transaction;

deleting, by the one or more virtual machines, the one or more decrypted private keys from the random access memory after the cryptocurrency transaction has been authenticated;

operating, by the one or more virtual machines, the system to implement the cryptocurrency transaction using a bitcoin cryptocurrency.

11. A computer program products comprising a non-transitory computer-readable storage medium having computer-readable instructions stored thereon, the computer-readable instructions being executable by a computerized device comprising processing hardware causing the computerized device to perform the steps of:

receiving, in a payment terminal of an online store, a payment transaction request for the cryptocurrency transaction from a mobile terminal during a checkout process of the online store;

receiving, by the payment server, a communication from the online store;

broadcasting, by the payment server, the communication to one or more virtual computing machines, the communication including the payment transaction request and a payment address for the online store;

receive, by the payment server, a verification request from one of the one or more virtual computing machines;

sending, by the payment server, the verification request to the mobile terminal, the verification request including a request for a personal identification number from the mobile terminal;

sending, by the mobile terminal, the personal identification number over a secure channel to the one or more virtual computing machines;

authenticating and executing, by the one or more virtual computing machines, the cryptocurrency transaction corresponding to the payment transaction request using the personal identification number; and sending, by the one or more virtual computing machines, a communication confirming execution of the at least one cryptocurrency transaction to the payment terminal of the online store.

* * * * *